Oct. 11, 1927. 1,644,806
D. WITBECK
MOTOR CAR TRUNK
Filed Jan. 3, 1927 2 Sheets-Sheet 1
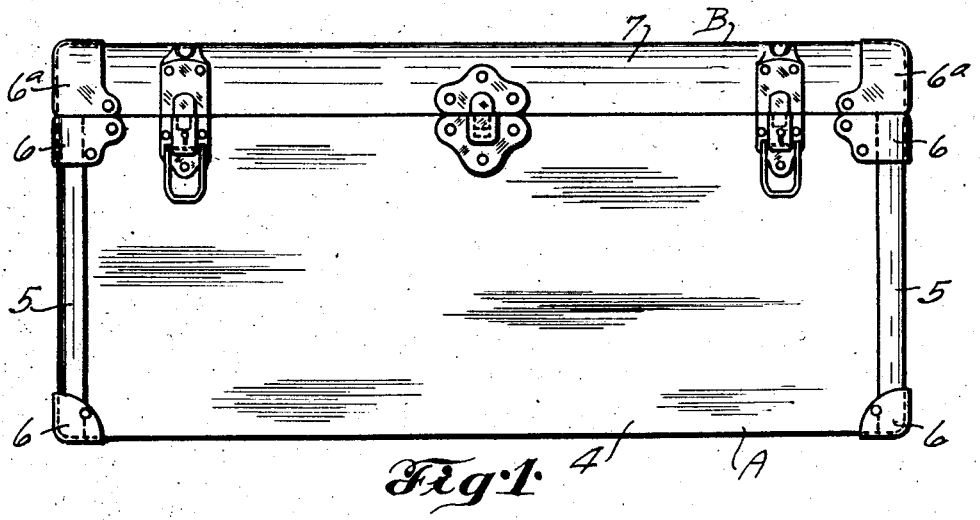
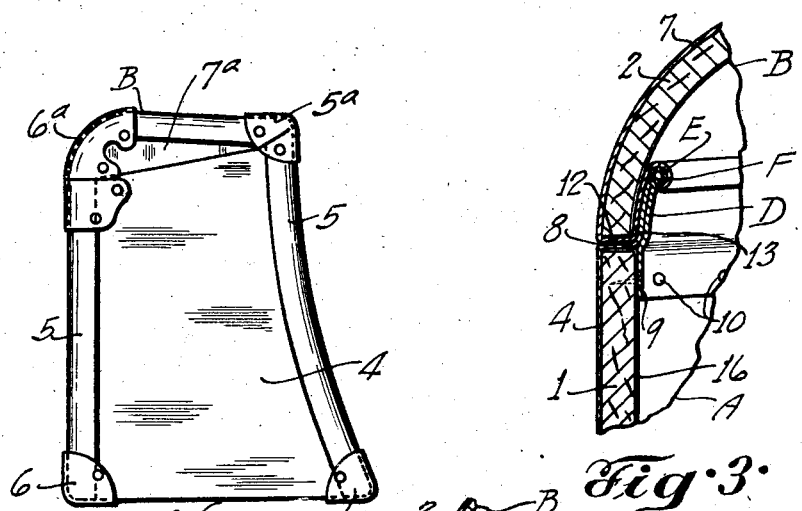
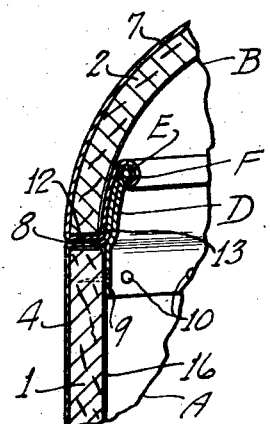
INVENTOR
Desford Witbeck.
By Oakwell Church
ATTORNEYS Oct. 11, 1927.
D. WITBECK
1,644,806
MOTOR CAR TRUNK
Filed Jan. 3, 1927
2 Sheets-Sheet 2
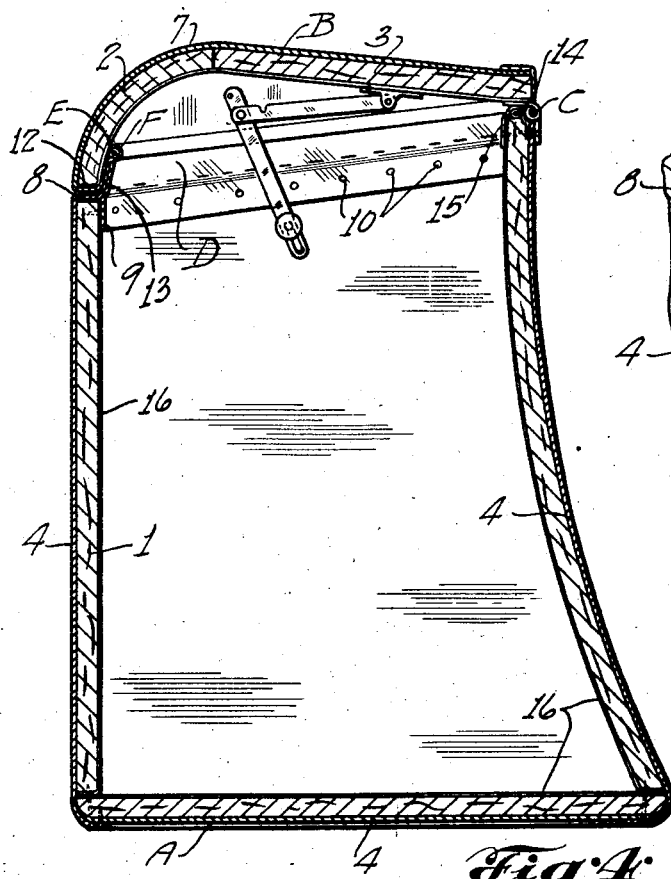
Fig. 4.
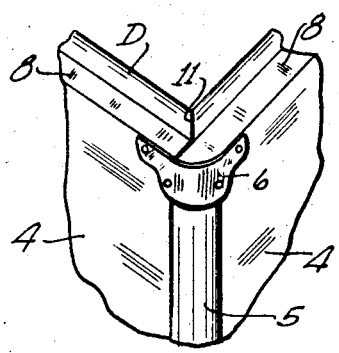
Fig. 5.
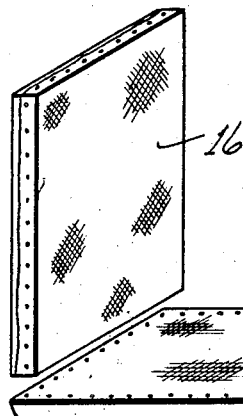
Fig. 6.
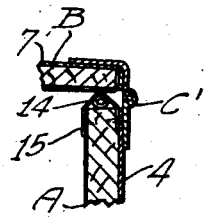
Fig. 7.
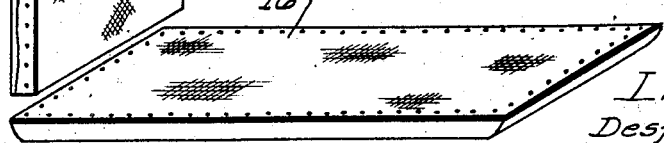
INVENTOR
Desford Witbeck.
By Bakewell & Church
ATTORNEYS Patented Oct. 11, 1927.

1,644,806

UNITED STATES PATENT OFFICE.

DESFORD WITBECK, OF ST. LOUIS, MISSOURI, ASSIGNOR TO GEORGE V. STEFFENS COMPANY, OF ST. LOUIS, MISSOURI, A CORPORATION OF MISSOURI.

MOTOR-CAR TRUNK.

Application filed January 3, 1927. Serial No. 158,592.

This invention relates to motor car trunks.

One object of the invention is to provide a motor car trunk, which, in addition to having a metal outer surface that can be finished the same as the body of the car on which the trunk is used, is so constructed that the trunk will not rumble or produce the objectionable sound that is an inherent characteristic of the metal trunks now used on motor cars.

Another object is to provide a motor car trunk that is equipped with a novel means for producing a dust and water tight joint between the body of the trunk and the lid.

And still another object of my invention is to provide a dust and water tight trunk that is of attractive appearance; that is rigid enough to successfully withstand the constant jarring and vibration to which it is subjected when in use and which is inexpensive to manufacture. Other objects and desirable features of my invention will be hereinafter pointed out.

Figure 1 of the drawings is a front elevational view of a motor car trunk constructed in accordance with my invention.

Figur 2 is an end elevational view of the trunk.

Figure 3 is an enlarged vertical sectional view of a portion of the lid and a portion of the body illustrating the means that is used to produce a tight joint between said elements.

Figure 3ª is a view similar to Figure 3, showing the lid partly raised.

Figure 4 is an enlarged vertical transverse sectional view of the trunk.

Figure 5 is a perspective view of one corner of the body of the trunk.

Figure 6 is a perspective view, illustrating how the inner lining is combined with the panels of the body before said panels are assembled; and Figure 7 is a sectional view, illustrating another type of hinge that can be used to connect the lid to the body.

Referring to the drawings which illustrate the preferred form of my invention, A designates the body of my improved trunk, and B designates the lid which is connected to said body preferably by a piano hinge C arranged at the rear edge of the lid. The particular shape of the body and of the lid is immaterial, so far as my invention is concerned, but I prefer to provide the lid with a convexed, flat edge portion whose bottom edge is arranged in abutting relation with the top edge of the front wall 1 of the body A, thereby producing a trunk whose lid has a rounded front edge which merges into the front wall of the body of the trunk. The body A and lid B are each constructed of wood and are provided with an outer covering formed by pieces of thin sheet metal applied to the walls of said elements and combined with moldings and corner members that cover the joints between said sheet metal pieces. Either solid lumber or laminated wood can be used in the construction of the body and lid, and while it is immaterial what method is employed to produce the rounded front edge of the lid, I prefer to form this portion of the lid from a sawed piece of lumber 2 of substantially concavo-convex shape in cross section that is attached in any suitable manner to the top wall 3 of the lid. The metal outer covering of the body A of the trunk will usually comprise pieces 4 of thin sheet metal of substantially the same width as the front, rear and end walls of said body applied to the outer faces of said walls and combined with moldings 5, constructed of metal or other suitable material, and corner members 6 that hide the joints between said sheet metal pieces 4. Usually, the lower edge portions of the sheet metal pieces that cover the front and rear walls of the body will be lapped over the sheet metal piece that covers the bottom wall of the body and confined in position by fastening devices driven into said bottom wall. The top 3 of the lid and the convexed portion 2 at the front edge of said lid are covered by a single piece 7 of sheet metal which extends continuously or unbrokenly from the rear edge of the lid to the front edge of the lid, and the end walls of the lid are covered by separate pieces 7ª of sheet metal, the joints between said sheet metal pieces 7 and 7ª being covered by moldings 5ª and corner members 6ª similar to those used on the body of the trunk.

The means that I prefer to use for producing a dust and water tight joint between the lid and body of the trunk is of novel construction and is composed of a flange D on the inside of the trunk integrally connected to the metal outer covering of the trunk, a gasket E against which the edge of said flange presses when the lid is closed, and a holder F for said gasket integrally connected to the metal outer covering of the trunk. Said flange can either be mounted on the lid and the holder for the gasket mounted on the body of the trunk, or the flange D can project upwardly from the top edge of the body into the lid and the gasket holder can be arranged on the inside of the lid at a point high enough above the bottom edge of the lid to insure the edge of the flange D pressing tightly against said gasket when the lid is closed, the latter construction being preferable and being the one herein illustrated. As shown in Figures 3, 3ª and 4, the sheet metal pieces 4 that cover the front and end walls of the body A are each provided at their upper edge with an integral, laterally-projecting portion 8 that covers the top edge of the wall with which it co-operates and which merges into an upwardly-projecting portion of said sheet that is doubled or folded over so as to produce a flange D composed of two thicknesses of metal, one of which has its lower edge portion 9 extended downwardly over the inner side of the body of the trunk and secured in position by nails 10 or other suitable fastening devices. At the two front corners of the body A the angularly-disposed portions 8 of the sheet metal pieces 4 and also the doubled or folded over portions of said sheets that constitute the flange D are joined together preferably by welded joints 11, as shown in Figure 5, so as to produce practically a continuous flange that projects upwardly from a practically continuous metal portion that covers the top edges of the front and end walls of the body A. The piece of sheet metal 7 that covers the top wall and convexed front end portion of the lid, and the sheet metal pieces 7ª that cover the end walls of the lid are each provided at their bottom edges with an integral, laterally-projecting portion 12 that laps over the bottom edge of the lid and merges into an upwardly-projecting portion 13 whose upper edge portion is bent or shaped so as to produce the holder F, previously referred to, in which the gasket E is arranged. The cross sectional shape of said gasket holder will vary according to the cross-sectional shape of the gasket that is used, but in the form of my invention herein illustrated the gasket E is formed from a piece of rubber tubing, and accordingly, the holder F is made substantially circular-shaped in cross section and is provided at its lower side with a contracted mouth of slightly less width than said gasket. To install the gasket it is only necessary to stretch or elongate the piece of rubber tubing that constitutes the gasket so as to reduce the diameter of said tubing sufficiently to permit it to be forced into the holder F through the contracted mouth at the lower side of the holder. Thereafter, when said tubing expands or resumes its original cross-sectional shape, it will be too large to drop out of the holder F. This method of supporting and holding the gasket E is desirable, in that it overcomes the necessity of using fastening devices or an adhesive to hold the gasket in position; it overcomes the necessity of removing fastening devices in the operation of renewing the gasket, and as no adhesive is applied to the gasket, there is no tendency for the gasket to become stiff or lose its natural resiliency.

When the lid B is closed it is firmly braced along its front edge and two end walls by the flange D on the body, which projects upwardly into the lid, thereby effectively preventing the lid from moving out of alignment with the body. Moreover, as the flange D is integrally connected to the sheet metal pieces 4 by the angularly-disposed portion 8 of said pieces which lap over the top edges of the front and end walls of the body, it will be impossible for water to enter the trunk or to find its way into the joint between the wooden and metal parts of the body, as might occur if the flange D were formed by a piece separate and distinct from the metal outer covering and detachably connected to the inner side of the upper edge portion of the body. When the lid is closed the only space through which water or dust might find its way into the trunk is the joint between the flange D on the outer covering of the body and the portion 13 on the outer covering of the lid that embraces said flange, but such water or dust would be effectively stopped when it came in contact with the gasket E that bears against the top edge of the flange D. Consequently, a means of the construction above described produces a joint between the lid and the body of the trunk that is water-tight and dust-tight. It also eliminates the possibility of water finding its way into the joints between the wood and metal parts of the trunk, due to the fact that the top edges of the front and end walls of the body are covered by integral portions of the outer metal covering that merge into the flange D, and the bottom edges of the front portion and end walls of the lid are covered by integral portions of the outer metal covering of the lid that merge into the portions 13 to which the gasket holder F is integrally connected. In addition to having the desirable characteristics above mentioned, such a means is inexpensive to manufacture, and it overcomes the necessity of using fastening devices or an adhesive to hold the gasket in operative position on the inside of the lid. Various means can be used for producing a tight joint between the rear edge of the lid B and the top edge of the rear wall of the body A. In the form of my invention shown in Figure 4 a gasket 14 formed preferably by a piece of rubber tubing is applied to the top edge of the rear wall of the body of the trunk and retained in position by a strip 15 of fabric that extends over said gasket and which is secured by an adhesive or in any other manner to the inner and outer faces of the rear wall of the body, the lid B being hinged to the body in such a manner that when said lid is moved downwardly into its closed position, it will compress the gasket 14, and thus produce a tight joint between the underside of the lid and the top edge of the rear wall of the body. The hinge C has its vertical leg or leaf arranged on the outside of the sheet metal piece 4 that covers the rear wall of the body, and its horizontal leg or leaf arranged on the underside of the lid, as shown in Figure 4, the top edge of the rear wall of the body being notched out sufficiently to provide a clearance for the knuckle of said hinge. Another type of hinge that can be used for connecting the lid to the body is illustrated in Figure 7, wherein one leaf or leg of the hinge C' is arranged on the outside of the sheet metal covering 4 for the rear wall of the body, and the other leg or leaf of said hinge which is located above the knuckle is made angle-shaped, so that the horizontally-disposed portion of same will lap over the sheet metal outer covering of the lid, the knuckle of said hinge projecting rearwardly or outwardly, thereby overcoming the necessity of notching the top edge of the rear wall of the body of the trunk.

In the conventional motor car truck the inner lining is applied to the body after the panels that constitute the walls of said body have been assembled or connected together. This requires the services of a skilled workman, in order to produce smooth corners and perfectly even and uniform seams, and consequently, the lining operation is an item of considerable importance in the cost of producing the trunk. In order to reduce the cost and also produce a trunk whose inner lining is free from wrinkles or seams, I apply the lining 16 to the panels that constitute the walls of the body portion A of the trunk before said walls are assembled or connected together. Thus, as shown in Figure 6, the inner lining 16 of the wall panels is drawn over the edges of said panels and secured in position by an adhesive or fastening devices before said walls are assembled, thereby making it possible to use unskilled labor in the lining operation, and moreover, producing a trunk that presents a neater or more attractive appearance than a trunk which is lined after the panels or members which constitute the walls have been connected together.

Having thus described my invention, what I claim as new and desire to secure by Letters Patent is:

1. A motor car trunk provided with a lid, a sheet metal outer covering for said lid provided with a portion that extends inwardly under the bottom edge of said lid and then upwardly on the inside of the lid, and a gasket holder integrally connected to said upwardly-projecting portion.

2. A motor car trunk, comprising a body and lid constructed of wood, a sheet metal outer covering for each of said elements, a flange on the inside of the trunk integrally connected to the outer covering of the body by a part that covers the top edge of said body, a downwardly-projecting extension on said flange that laps over the inner side of the body, a gasket holder on the inside of the lid integrally connected to the outer covering of the lid by a part that covers the bottom edge of the lid, and a gasket in said holder that is adapted to be engaged by said flange when the lid is closed.

3. A motor car trunk, comprising two elements, namely, a body and a lid, a flange on the inside of the trunk connected to one of said elements, the other element, and a resilient gasket in said holder, said holder being so constructed that said gasket can be inserted in or removed from said holder by deforming said gasket.

4. A motor car trunk, comprising two elements, namely, a body and a lid, a member on the inside of the trunk connected to one of said elements and bent to form a holder of substantially circular shape in cross section that has a contracted mouth, a piece of rubber tubing arranged in said holder so as to serve as a gasket, and a part connected to the other element of the trunk that engages said gasket when the lid is closed.

5. A motor car trunk, comprising two elements, namely, a body and a lid, a sheet metal outer covering for said elements, a flange projecting upwardly from the front and end walls of said body and integrally connected to the outer covering of said body, a gasket on the inner side of the lid that presses against said flange when the lid is closed, and a gasket mounted on the upper edge of the rear wall of the body.

DESFORD WITBECK.